United States Patent
Wang et al.

(10) Patent No.: US 9,245,578 B1
(45) Date of Patent: Jan. 26, 2016

(54) DISK DRIVE COMPENSATING FOR INTER-TRACK INTERFERENCE IN ANALOG READ SIGNAL

(71) Applicant: Western Digital Technologies, Inc., Irvine, CA (US)

(72) Inventors: Alvin J. Wang, Fremont, CA (US); Shafa Dahandeh, Laguna Niguel, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/089,912

(22) Filed: Nov. 26, 2013

(51) Int. Cl.
*G11B 20/10* (2006.01)

(52) U.S. Cl.
CPC .... *G11B 20/10018* (2013.01); *G11B 20/10212* (2013.01)

(58) Field of Classification Search
None
See application file for complete search history.

(56) References Cited

U.S. PATENT DOCUMENTS

| | | | |
|---|---|---|---|
| 5,229,901 A | 7/1993 | Mallary | |
| 5,870,239 A * | 2/1999 | Furuya | 360/55 |
| 6,154,335 A | 11/2000 | Smith et al. | |
| 6,157,510 A * | 12/2000 | Schreck et al. | 360/77.06 |
| 7,106,549 B2 | 9/2006 | Asakura | |
| 7,259,927 B2 * | 8/2007 | Harris | 360/48 |
| 8,139,301 B1 * | 3/2012 | Li et al. | 360/39 |
| 8,599,508 B1 | 12/2013 | Burd | |
| 8,638,513 B1 * | 1/2014 | Burd | 360/39 |
| 2010/0177419 A1 * | 7/2010 | Liu et al. | 360/32 |
| 2012/0105994 A1 | 5/2012 | Bellorado et al. | |
| 2013/0223199 A1 | 8/2013 | Lund et al. | |

OTHER PUBLICATIONS

S. Nabavi, B. V. K. V. Kumar, "Two-Dimensional Generalized Partial Response Equalizer for Bit-Patterned Media," IEEE Trans. Magn., vol. 44, No. 11, pp. 3789-3792, Nov. 2008.
K. S. Chan , R. Radhakrishnan , K. Eason , R. M. Elidrissi, J. Miles , B. Vasic and A. R. Krishnan, "Channel Models and Detectors for Two-Dimensional Magnetic Recording (TDMR)," IEEE Trans. Magn., vol. 46, No. 3, Mar. 2010.
Yunxiang Wu, Joseph A. O'Sullivan, Naveen Singla, and Ronald S. Indeck, "Iterative Detection and Decoding for Separable Two-Dimensional Intersymbol Interference," IEEE Transactions on Magnetics, vol. 39, No. 4, Jul. 2003.
U.S. Appl. No. 13/968,323, dated Aug. 15, 2013, to Yiming Chen, et al., 19 pages.

* cited by examiner

*Primary Examiner* — Daniell L Negron

(57) ABSTRACT

A disk drive is disclosed comprising a disk comprising a plurality of data tracks, and a head comprising a first read element and a second read element. The first read element is positioned over a first data track and the second read element is positioned over a second data track. A first analog read signal emanating from the first read element is adjusted based on a second analog read signal emanating from the second read element in order to reduce noise in the first analog read signal due to interference from the second data track.

22 Claims, 4 Drawing Sheets

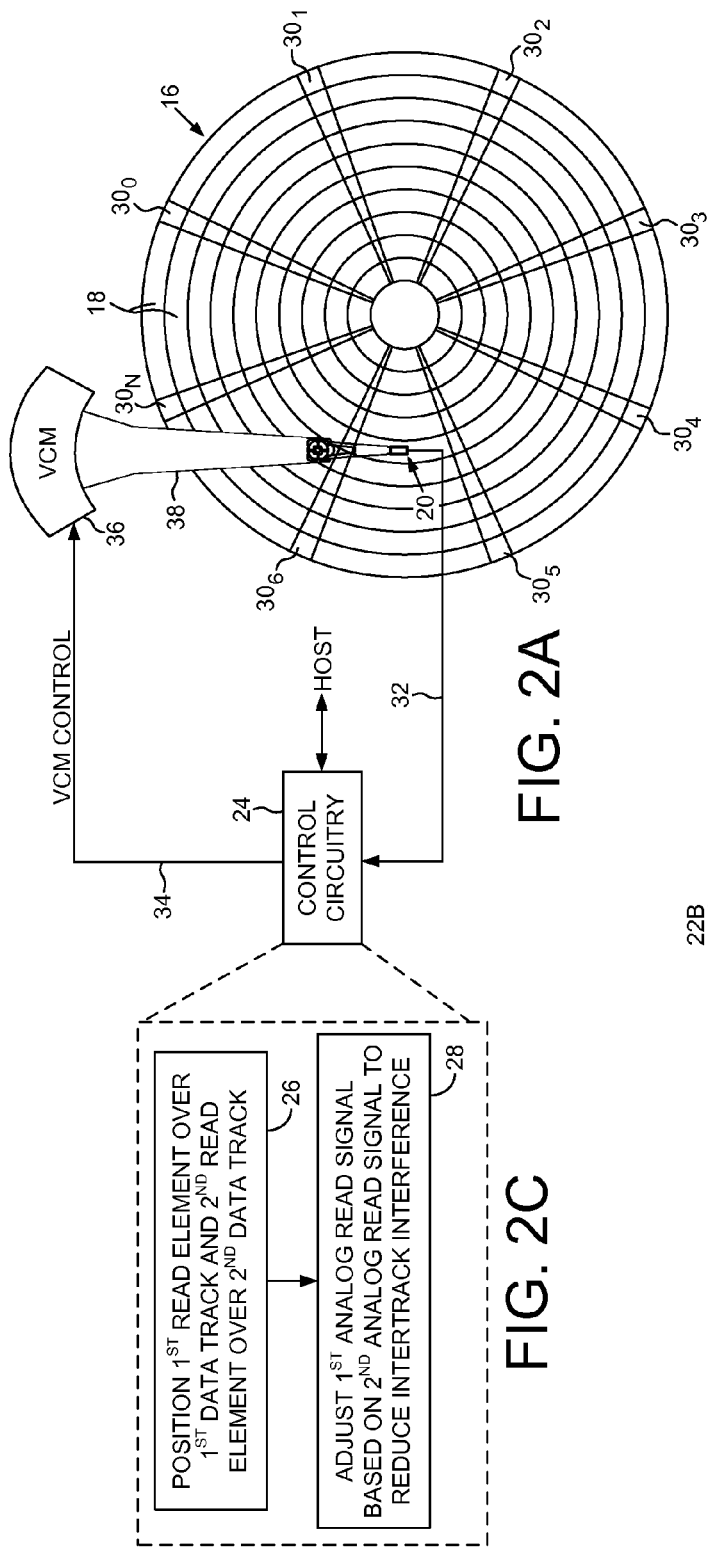
FIG. 2A
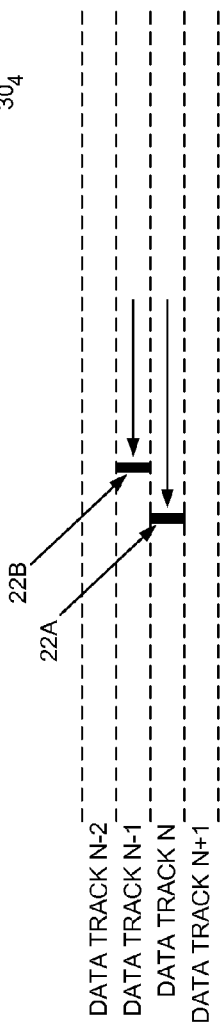
FIG. 2B
FIG. 2C

DISK DRIVE COMPENSATING FOR INTER-TRACK INTERFERENCE IN ANALOG READ SIGNAL

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

BRIEF DESCRIPTION OF THE DRAWINGS

FIG. 2A shows a disk drive according to an embodiment comprising a head actuated over a disk comprising a plurality of data tracks defined relative to the servo tracks.

FIG. 2B shows an embodiment wherein the head comprises a first read element positioned over a first data track and a second read element positioned over a second data track, wherein the second read element leads the first read element.

FIG. 2C is a flow diagram according to an embodiment wherein a first analog read signal emanating from the first read element is adjusted based on a second analog read signal emanating from the second read element in order to reduce noise in the first analog read signal due to interference from the second data track.

DETAILED DESCRIPTION

Figure 1:
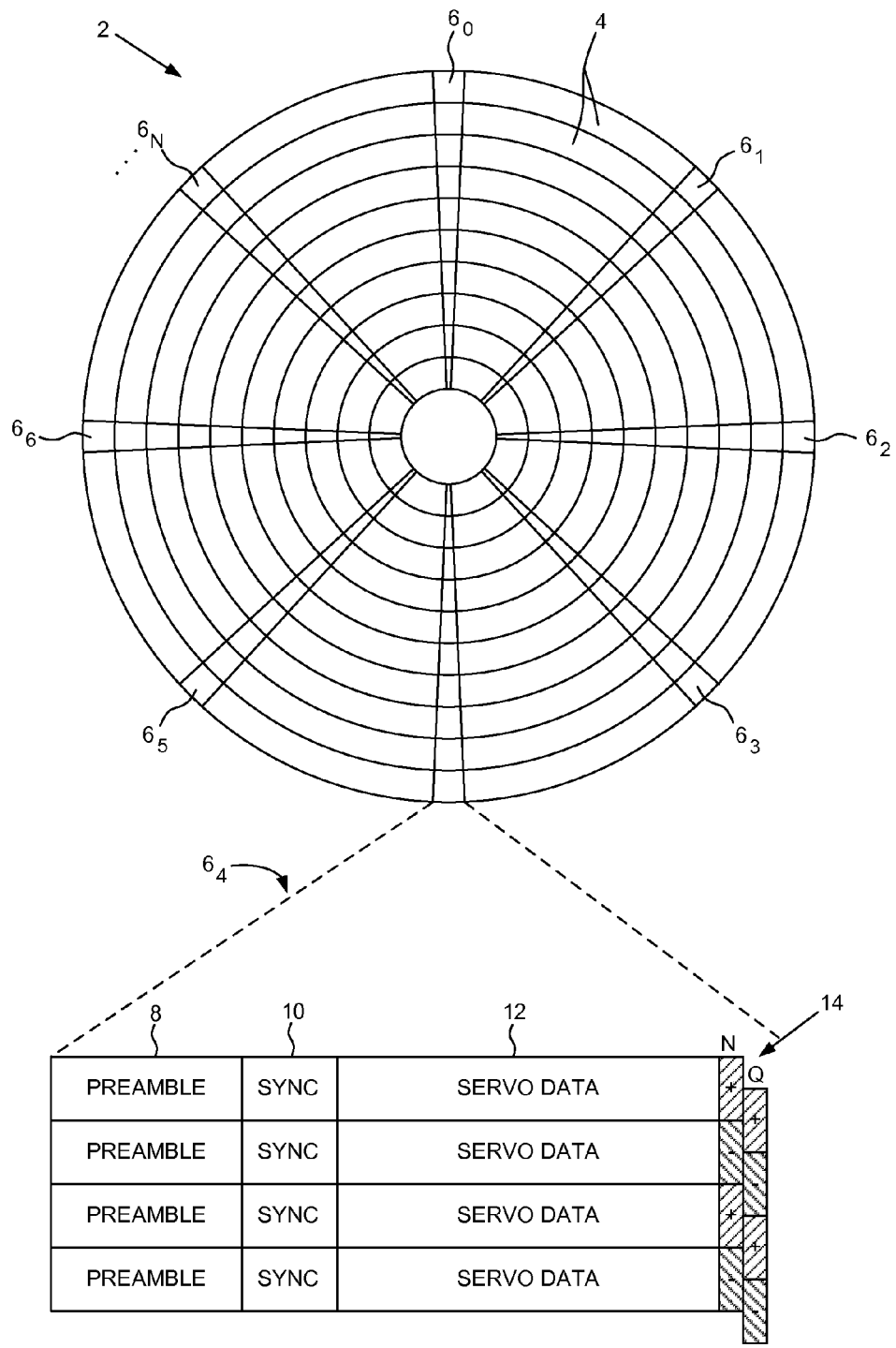
FIG. 1 shows a prior art disk format comprising a plurality of servo tracks defined by servo sectors.

FIG. 2A shows a disk drive according to an embodiment comprising a disk 16 comprising a plurality of data tracks 18, and a head 20 comprising a first read element 22A and a second read element 22B (FIG. 2B). The disk drive further comprises control circuitry 24 configured to execute the flow diagram of FIG. 2C, wherein the first read element is positioned over a first data track and the second read element is positioned over a second data track (block 26). A first analog read signal emanating from the first read element is adjusted based on a second analog read signal emanating from the second read element in order to reduce noise in the first analog read signal due to interference from the second data track (block 28), thereby generating an adjusted analog read signal.

In the embodiment of FIG. 2A, the disk 16 comprises a plurality of servo sectors $30_0$-$30_N$ that define a plurality of servo tracks, wherein the data tracks 18 are defined relative to the servo tracks at the same or different radial density (tracks per inch (TPI)). The control circuitry 24 processes a read signal 32 emanating from the head 20 to demodulate the servo sectors $30_0$-$30_N$ and generate a position error signal (PES) representing an error between the actual position of the head and a target position relative to a target track. The control circuitry 24 processes the PES using a suitable servo control system to generate a control signal 34 applied to a voice coil motor (VCM) 36 which rotates an actuator arm 38 about a pivot in order to actuate the head 20 radially over the disk 16 in a direction that reduces the PES. In one embodiment, the VCM 36 may be controlled to actuate the head 20 over the disk 16 in coarse movements while a suitable microactuator may be controlled to actuate the head 20 over the disk 16 in fine movements. The servo sectors $30_0$-$30_N$ may comprise any suitable head position information, such as a track address for coarse positioning and servo bursts for fine positioning. The servo bursts may comprise any suitable pattern, such as an amplitude based servo pattern or a phase based servo pattern.

Figure 3:
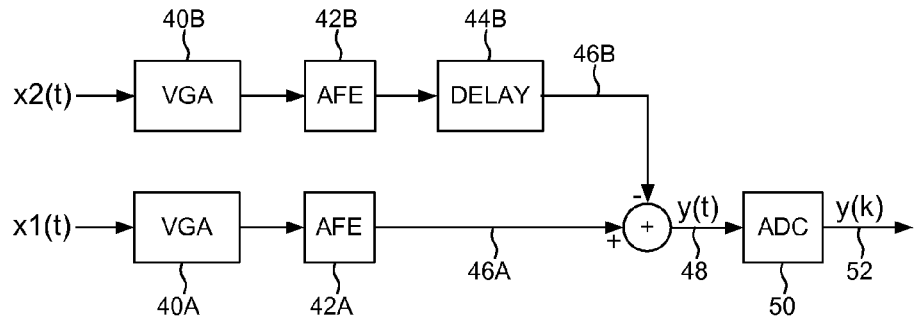
FIG. 3 shows an embodiment wherein the second analog read signal is delayed and then subtracted from the first analog read signal.

As the radial density of the data tracks 18 decreases in order to increase the capacity of the disk 16, the ability to accurately recover the data recorded in a target data track decreases due to interference from one or more adjacent (or near adjacent) data tracks. Referring again to FIG. 2C, when reading data from data track N using the first read element 22A, the magnetic transitions representing the data recorded in the adjacent data track N-1 may induce noise in the first analog read signal x1(t), thereby decreasing the probability of accurately detecting the data recorded in data track N. FIG. 3 illustrates an embodiment for compensating for this intertrack interference (ITI) using the second read element 22B that is positioned over the adjacent data track N-1. The first analog read signal x1(t) is amplified by a first variable gain amplifier (VGA) 40A and filtered by a first analog front end (AFE) filter 42A. The second analog read signal x2(t) is amplified by a second VGA 40B and filtered by a second AFE filter 42B. The signal output by the second AFE filter 42B is delayed 44B, and the delayed signal 46B is subtracted from the signal 46A output by the first AFE filter 42A to generate the adjusted analog read signal 48. In this manner, the noise in the first analog read signal x1(T) due to interference from the second data track is reduced such that the adjusted analog read signal 48 better represents the data recorded in the first data track. In the embodiment of FIG. 3, the adjusted analog read signal 48 is sampled using an analog-to-digital converter (ADC) 50, and the resulting signal samples 52 processed to detect the data recorded in the first data track using any suitable data detection algorithm.

In the embodiment of FIG. 2B, the head 20 is fabricated so that the second read element 22B is offset laterally from the first read element 22A and so that the second read element 22B leads the first read element 22A. That is, as the disk 16 rotates under the head 20, the second read element 22B leads the first read element 22A as shown in FIG. 2B such that the second analog read signal $x2(t)$ leads the first analog read signal $x1(t)$. To compensate for this phase offset between the first and second analog read signals, the second analog read signal is delayed at block 44B of FIG. 3 using any suitable analog delay element before being subtracted from the first analog read signal. In an embodiment described below, the delay between the first and second read elements is initially unknown and is therefore calibrated by the control circuitry 24 using any suitable calibration procedure.

The head 20 may comprise any suitable number of read elements for compensating for ITI from one or more adjacent (or near adjacent) data tracks. For example, in one embodiment the head 20 may comprise a first read element 22A positioned over a first data track N as shown in FIG. 2B, a second read element 22B positioned over an adjacent data track N−1, and a third read element (not shown) positioned over a near adjacent data track N−2. That is, the ITI affecting the first data track N may be caused by interference from an adjacent data track N−1 as well as a near adjacent data track N−2. Referring again to FIG. 3, since the near adjacent data track N−2 is further away from the first data track N, the gain of the corresponding third read signal may be reduced (via the VGA) before subtracting from the first analog read signal.

Figure 4A:
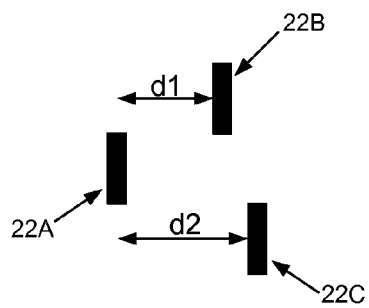
FIG. 4A shows an embodiment wherein the head comprises second and third read elements offset radially from the first read element in order to reduce noise in the first analog read signal due to interference from second and third data tracks adjacent the first data track.

FIG. 4A shows an embodiment wherein the head 20 comprises a first read element 22A for positioning over a first data track, a second read element 22B for positioning over a second data track on a first side of the first data track, and a third read element 22C for positioning over a third data track on a second (opposite) side of the first data track. The resulting second and third analog read signals are used to adjust the first analog read signal in order to reduce noise in the first analog read signal due to interference from the second and third data tracks, thereby generating the adjusted analog read signal. In the embodiment of FIG. 4A, the second read element 22B is offset laterally from the first read element 22A resulting in a first delay d1 between the first analog read signal and the second analog read signal, and the third read element 22B is offset laterally from the first read element 22A resulting in a second delay d2 between the first analog read signal and the third analog read signal. In one embodiment, the first delay d1 and the second delay d2 are calibrated by the control circuitry 24 using any suitable calibration procedure.

Figure 4B:
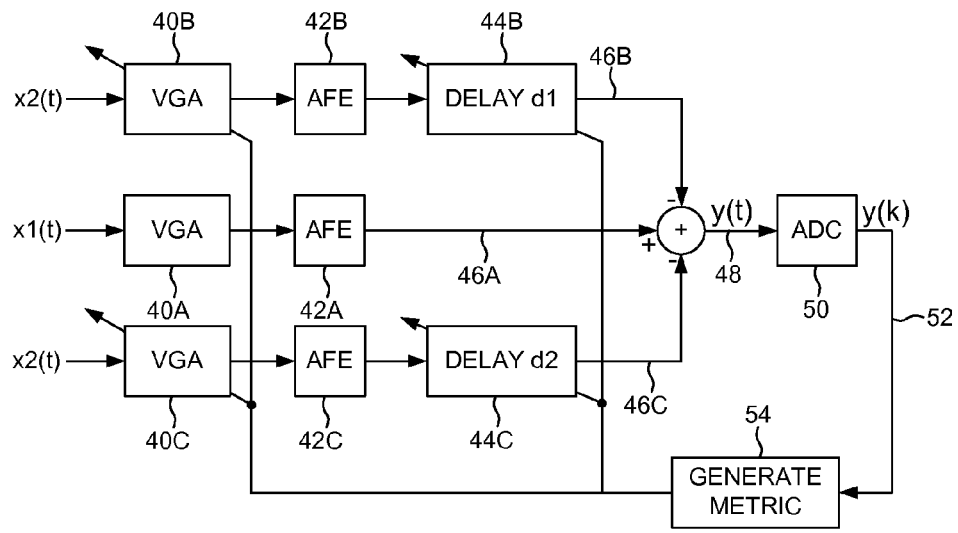
FIG. 4B shows an embodiment wherein an error metric is generated based on the adjusted analog read signal which is used to adjust a gain and/or delay of the second and third analog read signals.

FIG. 4B shows an embodiment for adjusting the first analog read signal $x1(t)$ generated by the first read element 22A based on the second analog read signal $x2(t)$ generated by the second read element 22B and based on the third analog read signal $x3(t)$ generated by the third read element 22C. The components shown in FIG. 4B are similar to the components described above with reference to FIG. 3. In one embodiment, the delay d1 for delaying the second analog read signal $x2(t)$ may be the same or different than the delay d2 for delaying the third analog read signal $x3(t)$. A different delay for each read element may be due to a different offset relative to the first read element 22A as shown in FIG. 4A.

In one embodiment, the control circuitry 24 executes a calibration procedure in order to calibrate the delay for the read element(s) of adjacent track(s). In addition, the control circuitry 24 may calibrate the gain for the respective VGA(s) that amplify the analog read signal(s) from the adjacent track(s). The delay and/or gain for the adjacent track analog read signal(s) may be adjusted based on an error metric that may be generated in the analog domain or the digital domain. For example, in one embodiment a first periodic pattern (e.g., a 2T pattern) may be written to the first data track using a first phase and a second periodic pattern may be written to the second data track using a second phase different from the first phase so that the second periodic pattern induces ITI into the first analog read signal. When reading the first periodic pattern from the disk, the first analog read signal comprises a target sinusoid that is distorted by the ITI of the second data track. Accordingly, in one embodiment the target sinusoid may be generated in the analog domain and subtracted from the adjusted analog read signal 48 to generate an analog error signal. The analog error signal may be used to adjust the delay and/or gain of the second analog read signal until the analog error signal falls below a threshold.

In another embodiment, the error metric for calibrating the delay and/or gain of the second analog read signal may be generated in the digital domain by evaluating the signal samples 52 of the adjusted analog read signal 48. An example of this embodiment is shown in FIG. 4B wherein block 54 evaluates the signal samples 52 to generate a digital error signal that is used to adjust the delay and/or gain of the second and third analog read signals. Similar to the analog error signal described above, the calibration procedure may be executed until the digital error signal falls below a threshold. Any suitable error metric may be generated in the digital domain by evaluating the signal samples 52 of the adjusted analog read signal, such as an error between the actual signal samples and ideal signal samples, a timing recovery error, an error metric associated with a sequence detector such as a branch metric or a log-likelihood ratio, or a bit error rate of an estimated data sequence output by a sequence detector.

In one embodiment, the control circuitry 24 may execute the calibration procedure by writing a known pattern (e.g., a test pattern) to the first data track and the adjacent data track(s), and then reading the test patterns to generate the error metric for adjusting the delay and/or gain of the adjacent track analog read signal(s). In one embodiment, the known test pattern may also be used to generate the error metric, such as to generate the ideal signal samples that may be subtracted from the actual signal samples 52, or to generate the ideal bit sequence that may be subtracted from the detected bit sequence. In one embodiment, the known test pattern may comprise a known part of a data sector or a servo sector, such as a preamble, sync mark, or track address. In another embodiment, the control circuitry 24 may adjust the delay and/or gain of the adjacent track analog read signal(s) based on an error metric generated from reading user data from the data tracks during a normal read operation. That is, the delay and/or gain for the adjacent track analog read signal(s) may be continuously tuned during normal operation to account for variations in the disk drive that may affect the ITI, such as a variation in the ambient temperature that may cause an expansion of the disk and/or the head.

In one embodiment, the data tracks may be grouped into zones over the radius of the disk, and the delay and/or gain of the adjacent track analog read signal(s) may be calibrated for each zone. For example, in one embodiment the delay between the first analog read signal and the adjacent track analog read signal(s) may change due to a skew angle of the head changing as the radial location of the head changes. In another embodiment, the radial density of the data tracks (TPI) may change over the radius of the disk and therefore the amplitude of the ITI from the adjacent tracks may vary based on the radial location of the head. Accordingly, an array of delay and/or gain values may be calibrated for the plurality of zones which is then indexed during normal operation based on the radial location of the head.

Figure 5A:
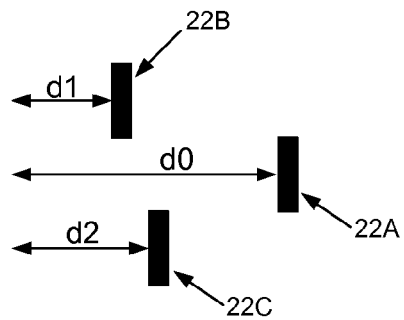
FIG. 5A shows an embodiment wherein the first head positioned over a target data track leads second and third heads positioned over adjacent data tracks.
Figure 5B:
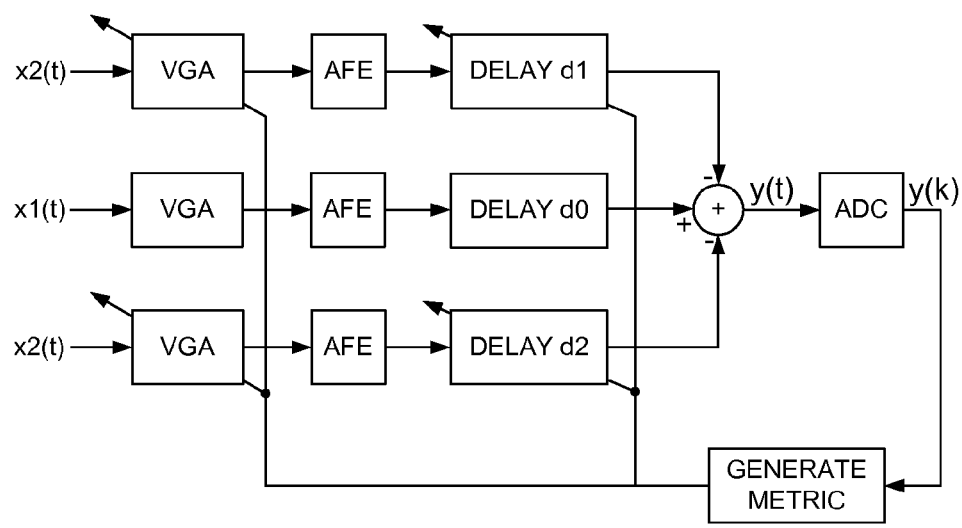
FIG. 5B shows an embodiment wherein the first, second, and third analog read signals are delayed in order to phase align the analog read signals.

In the embodiment shown in FIGS. 4A and 4B, the head 20 is fabricated so that the second and third read elements 22B and 22C lead the first read element 22A, thereby resulting in delays d1 and d2 between the corresponding analog read signals. FIGS. 5A and 5B show an alternative embodiment wherein the first read element 22A leads the second and third read elements 22B and 22C. In this embodiment, the first analog read signal is delayed by d0, and the second and third analog read signals are delayed by d1 and d2 relative to the delay d0 as illustrated in FIG. 5A, thereby phase aligning the analog read signals.

Any suitable analog delay element may be employed to delay either or both of the first analog read signal and the adjacent track analog read signal(s). The analog delay element may comprise passive components (e.g., inductors, resistors, capacitors, etc.), and/or active components (e.g., amplifier, switches, etc.). In one embodiment the analog delay element may comprise a programmable bank of passive components that may be configured using switches in order to adjust the delay of the analog read signal. Although the VGA, AFE filter and delay elements are illustrated in FIG. 4B as separate components, these components may be considered as part of the AFE filter. That is, in one embodiment the VGA may be considered as the gain of the AFE filter, and the delay elements may be considered as the phase of the AFE filter. Accordingly, in one embodiment the VGA, AFE filter, and delay elements may be fabricated as separate components, or they may be fabricated together in an integrated circuit.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being configured to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A disk drive comprising:
   a disk comprising a plurality of data tracks;
   a head comprising a first read element and a second read element; and
   control circuitry configured to:
      position the first read element over a first data track and the second read element over a second data track;
      adjust a first analog read signal emanating from the first read element based on a second analog read signal emanating from the second read element in order to reduce noise in the first analog read signal due to interference from the second data track, thereby generating an adjusted analog read signal;
      adjust a gain of the second analog read signal to generate an amplified analog read signal;
      adjust the first analog read signal based on the amplified analog read signal;
      generate an error metric based on the adjusted analog read signal; and
      adjust the gain of the second analog read signal based on the error metric.

2. The disk drive as recited in claim 1, wherein the control circuitry is further configured to adjust the first analog read signal by subtracting the second analog read signal from the first analog read signal.

3. The disk drive as recited in claim 1, wherein the control circuitry is further configured to:
   sample the adjusted analog read signal to generate signal samples; and
   generate the error metric based on the signal samples.

4. The disk drive as recited in claim 1, wherein the control circuitry is further configured to:
   delay at least one of the first and second analog read signal to generate a delayed analog read signal; and adjust the first analog read signal based on the delayed analog read signal.

5. The disk drive as recited in claim 4, wherein the control circuitry is further configured to:
   generate an error metric based on the adjusted analog read signal; and
   adjust the delay based on the error metric.

6. The disk drive as recited in claim 5, wherein the control circuitry is further configured to:
   sample the adjusted analog read signal to generate signal samples; and
   generate the error metric based on the signal samples.

7. The disk drive as recited in claim 4, wherein the second read element is offset laterally from the first read element.

8. The disk drive as recited in claim 1, wherein the head further comprises a third read element and the control circuitry is further configured to:
   position the third read element over a third data track; and
   adjust the first analog read signal emanating from the first read element based on the second analog read signal emanating from the second read element and a third analog read signal emanating from the third read element in order to reduce noise in the first analog read signal due to interference from the second data track and the third data track, thereby generating the adjusted analog read signal.

9. The disk drive as recited in claim 8, wherein the second data track is on a first side of the first data track and the third data track is on a second side of the first data track opposite the first side.

10. The disk drive as recited in claim 8, wherein:
    the second read element is offset laterally from the first read element; and
    the third read element is offset laterally from the first read element.

11. A method of operating a disk drive, the method comprising:
    positioning a first read element over a first data track of a disk and a second read element over a second data track of the disk;
    adjusting a first analog read signal emanating from the first read element based on a second analog read signal emanating from the second read element in order to reduce noise in the first analog read signal due to interference from the second data track, thereby generating an adjusted analog read signal;
    adjusting a gain of the second analog read signal to generate an amplified analog read signal;
    adjusting the first analog read signal based on the amplified analog read signal;
    generating an error metric based on the adjusted analog read signal; and
    adjusting the gain of the second analog read signal based on the error metric.

12. The method as recited in claim 11, further comprising adjusting the first analog read signal by subtracting the second analog read signal from the first analog read signal.

13. The method as recited in claim 11, further comprising:
    sampling the adjusted analog read signal to generate signal samples; and
    generating the error metric based on the signal samples.

14. The method as recited in claim 11, further comprising:
    delaying at least one of the first and second analog read signal to generate a delayed analog read signal; and
    adjusting the first analog read signal based on the delayed analog read signal.

15. The method as recited in claim 14, further comprising:
    generating an error metric based on the adjusted analog read signal; and
    adjusting the delay based on the error metric.

16. The method as recited in claim 15, further comprising:
    sampling the adjusted analog read signal to generate signal samples; and
    generating the error metric based on the signal samples.

17. The method as recited in claim 14, wherein the second read element is offset laterally from the first read element.

18. The method as recited in claim 11, wherein the head further comprises a third read element and the method further comprises:
    positioning the third read element over a third data track; and
    adjusting the first analog read signal emanating from the first read element based on the second analog read signal emanating from the second read element and a third analog read signal emanating from the third read element in order to reduce noise in the first analog read signal due to interference from the second data track and the third data track, thereby generating the adjusted analog read signal.

19. The method as recited in claim 18, wherein the second data track is on a first side of the first data track and the third data track is on a second side of the first data track opposite the first side.

20. The method as recited in claim 18, wherein:
    the second read element is offset laterally from the first read element; and
    the third read element is offset laterally from the first read element.

21. A disk drive comprising:
    a disk comprising a plurality of data tracks;
    a head comprising a first read element, a second read element, and a third read element; and
    control circuitry configured to:
      position the first read element over a first data track, the second read element over a second data track, and the third read element over a third data track;
      adjust a first analog read signal emanating from the first read element based on a second analog read signal emanating from the second read element in order to reduce noise in the first analog read signal due to interference from the second data track, thereby generating an adjusted analog read signal; and
      adjust the first analog read signal emanating from the first read element based on the second analog read signal emanating from the second read element and a third analog read signal emanating from the third read element in order to reduce noise in the first analog read signal due to interference from the second data track and the third data track, thereby generating the adjusted analog read signal.

22. A method of operating a disk drive, the method comprising:
    positioning a first read element over a first data track of a disk, a second read element over a second data track of the disk, and a third read element over a third data track of the disk;
    adjusting a first analog read signal emanating from the first read element based on a second analog read signal emanating from the second read element in order to reduce noise in the first analog read signal due to interference from the second data track, thereby generating an adjusted analog read signal; and adjusting the first analog read signal emanating from the first read element based on the second analog read signal emanating from the second read element and a third analog read signal emanating from the third read element in order to reduce noise in the first analog read signal due to interference from the second data track and the third data track, thereby generating the adjusted analog read signal.

* * * * *